United States Patent [19]
Sass et al.

[11] Patent Number: 5,404,162
[45] Date of Patent: Apr. 4, 1995

[54] METHOD TO IMAGE HIGH SPEED EVENTS

[75] Inventors: David T. Sass, Fair Haven; Steven M. Shepard, Southfield, both of Mich.

[73] Assignee: The United States of America as represented by the Secretary of the Army, Washington, D.C.

[21] Appl. No.: 73,846

[22] Filed: Jun. 7, 1993

[51] Int. Cl.[6] .............................................. H04N 5/225
[52] U.S. Cl. ...................................... 348/86; 348/207
[58] Field of Search .................. 348/207, 86, 901, 61, 348/157, 143; 382/8; H04N 5/225

[56] References Cited
U.S. PATENT DOCUMENTS 4,970,597 11/1990 Shepard .............................. 348/905
5,136,383 8/1992 Shepard et al. ...................... 348/864

*Primary Examiner*—Joseph Mancuso
*Assistant Examiner*—Wendy R. Greening
*Attorney, Agent, or Firm*—Peter A. Taucher; David L. Kuhn

[57] ABSTRACT

A new imaging technique increases the effective frame rate of a video camera to a rate as high as one million Hz. In this technique, raw video signals are taken from the camera's sensors before the camera's logic does any signal processing. These signals are sent to an interface unit which selects signal segments for creating a composite image, the segments' size being as small as one or two pixels. Portions of the video signal that are not selected are given a zero value by the interface unit. The video signals are thereafter sent to the camera's signal processing logic, which converts the video signals into signals representing frames comprised of raster scan lines. The selected video signal segments become discrete portions of frames which are collected by a frame grabber. The frame grabber counts the times it has collected each discrete frame portion, determines an average value for each discrete portion, and builds the composite image from the averaged frame portions.

6 Claims, 2 Drawing Sheets

METHOD TO IMAGE HIGH SPEED EVENTS

GOVERNMENT USE

The invention described herein may be manufactured, used and licensed by or for the U.S. Government for governmental purposes without payment to us of any royalty thereon.

BACKGROUND

Our invention relates to methods of imaging recurring high speed events, and is a variation of the method disclosed in U.S. Pat. No. 4,970,597 to Shepard for high speed imaging with a standard video camera. Of interest also is U.S. Pat. No. 5,136,383 to Shepard and Sass, which describes hardware useful in the technique of the '597 patent. We believe that U.S. Pat. Nos. 4,970,597 and 5,136,383 and references cited therein are the most relevant prior art to the present invention.

In the Shepard '597 method, the camera executes raster patterns wherein the camera repeatedly scans a series of parallel horizontal lines which comprise an image field. The camera then generates a continuous video signal comprised of line signals representing the horizontal lines. As the camera continuously views the recurring event, a flagging signal is generated before each recurrence of the event. Within a complete image field, one or more of the recurring events may begin during an aperture signal, and the line then being scanned will accurately represent a portion of the event. Signals or data representing these accurate, or synchronized, lines are collected and stored in a computer memory.

The Shepard '597 method uses a commercially available infrared imaging camera having RS-170 video output. The raster pattern of the camera is traced by two periodically driven scanning mirrors, one driven vertically and one driven horizontally. The vertical scanning mirror is driven at a frequency of 60 Hz and the horizontal scanning mirror is driven at a frequency of 4 kHz. The vertical scanning mirror frequency is appropriate for generating a video signal, but the horizontal mirror frequency is one-fourth as fast as needed for RS-170 video output.

Two camera features remedy the horizontal mirror's slowness. First, the camera accepts input from the horizontal mirror during both forward and reverse passes and digitizes the data from these passes. Since the camera receives "reverse scan" data in reverse order, the camera re-reverses this data into proper, "forward scan" order. Use of data from reverse passes speeds the effective frequency of the horizontal mirror but impairs image accuracy when rapidly changing events are viewed.

The second camera feature increasing the horizontal mirror's effective frequency is the duplicated output of each scanned line. Thus, if the first horizontal line of the camera's raster pattern output is a forward scanned line, then the second line of the camera's raster pattern output is a copy of the first forward scan line. The third line of the camera's raster pattern output will be a reverse scanned output and the fourth output line will be a copy of the third, reverse scanned line. The raster pattern output from the camera will be repetitions of the sequence just described. As described in Shepard '597 and Shepard/Sass '383, one can limit which camera raster output lines will be used to compile a composite image of a given event. No matter what output lines are used by the method in these references, the camera's effective frame rate camera was limited only by the 125 microseconds required for a single scan line, whereby the effective frame rate of the camera was increased to 4,000 frames per second.

SUMMARY

Our improved imaging technique uses the same camera as described in the aforementioned patents but has a higher frame rate, up to 1 million frames per second. In our improved technique, raw video signals are taken from the camera's sensors before the camera's processing logic affects the raw signals. The raw video signals from the sensors is sent to an interface unit which selects certain raw video signal segments for use in creating a composite image. One can vary the size of the selected segments, which can be as small as one or two pixels (temporally less than a microsecond) or large enough to include several horizontal scan lines. Nonselected portions of the raw video signal are zeroed out, or given a zero value by the interface unit. The partially zeroed out, now semi-raw video signals are sent to the camera's signal processing logic, which converts the semi-raw video signals into signals representing frames comprised of raster scan lines. The selected non-zeroed video signal segments become discrete portions of frames which are collected by a frame grabber to form a composite image of the event seen by the camera. The frame grabber counts the number of times it collects each discrete frame portion, determines an average value for each discrete portion, and builds the composite image from the averaged frame portions.

DETAILED DESCRIPTION

Figure 1:
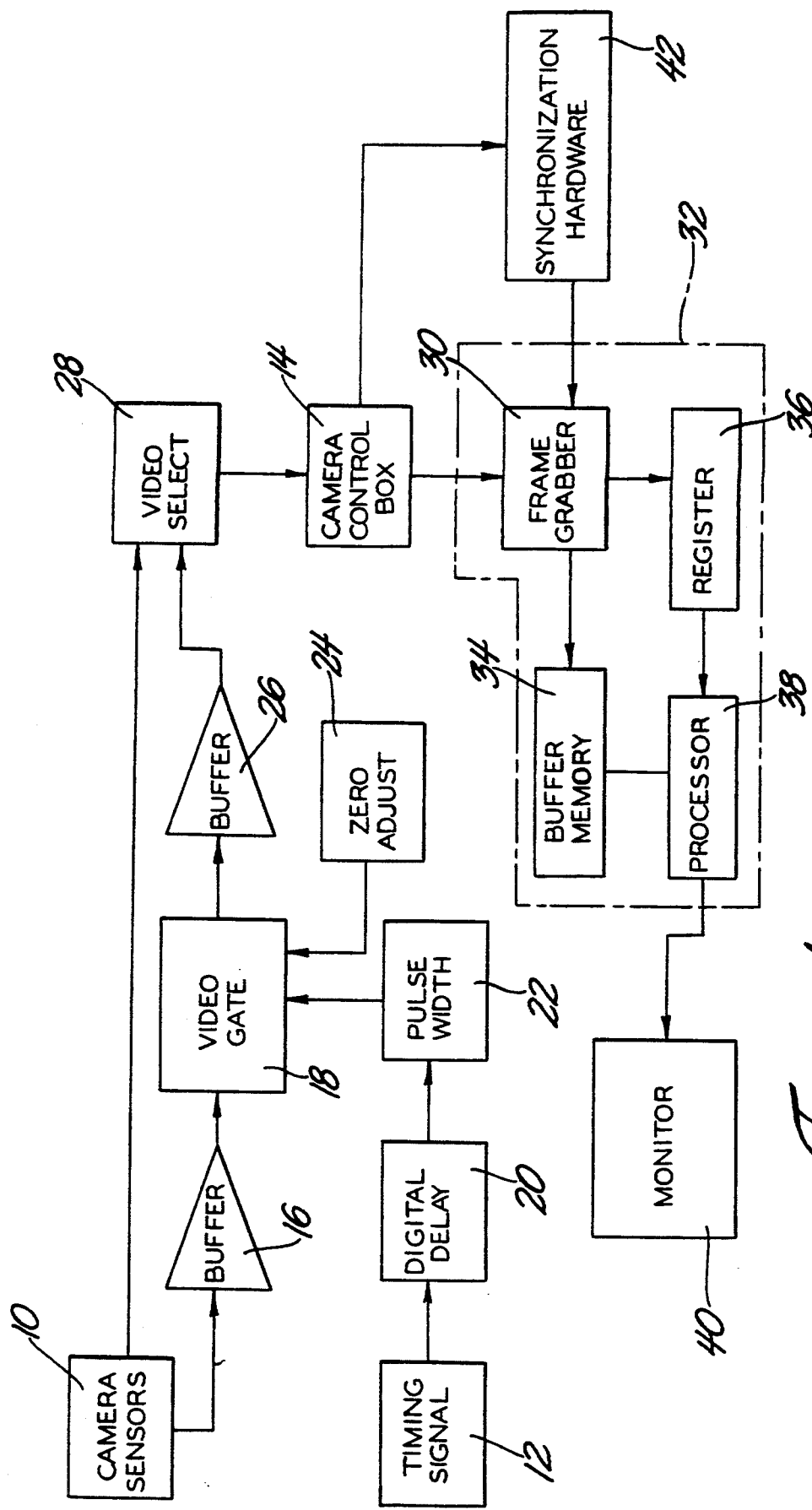
FIG. 1 is a flow chart showing our improved imaging method.

FIG. 1 diagrammatically shows camera sensors 10, which are typically infrared sensors but which can be sensors for any electromagnetic spectrum of energy. The camera (not shown) of which the sensors are part is typically a commercially available video camera that continuously scans a target and sends signals representing sets of parallel lines grouped into frames, or raster patterns. The camera used to develop our improved imaging technique is the one used in U.S. Pat. Nos. 4,970,597 and 5,136,383, which are hereby incorporated by reference. The camera includes periodically driven, vertically and horizontally oscillated mirrors. The mirrors cooperate to scan an object plane and produce a raster pattern on the camera's image plane where sensors 10 lie.

The camera conventionally sends a continuous raw video signal to camera control box 14, which normally processes the raw video signal as previously mentioned in the BACKGROUND section. However, in our method, the raw video signal from camera sensors 10 is rerouted through buffer 16 to video gate 18. Buffer 16 is not a memory, but rather is a means to adjust signal strength, so that the range of signal values from sensors 10 is compatible with the range of signal values over which video gate 18 operates.

As the camera views a repeating high speed event, such as the firing of a spark plug or a given position of a turning fan blade, a timing signal 12 is generated at a chosen constant time before the event. The timing signal can be generated by engine management software controlling the spark plug or the fan blade's interruption of a light beam incident upon a photoelectric cell. The timing signal is sent to an adjustable digital delay circuit 20, which retards the timing signal by a preselected amount.

Pulse width circuit 22 sends signals in response to signals output from digital delay circuit 20. Because of the timing signal retardation, the circuit 22 signals reach gate 18 simultaneously with a repetition of the event. The signals from circuit 22 each have a predetermined width which corresponds to the desired effective exposure time that one wishes the camera to have. The smallest pulse width corresponds to an exposure time of less than one microsecond. Circuit 22 includes known means for a human operator to set the pulse width of its output signals.

Video gate 18 multiplies the buffered video signal by a factor of 1 during a pulse from circuit 22, which is when the targeted event is considered "ON". Gate 18 multiplies the buffered video signal by a factor of 0 in the absence of a pulse from circuit 22, when the targeted event is considered "OFF,". Consequently, portions of the continuous video signal from sensors 10 that are sent to gate 18 in the absence of pulses from circuit 22 are zeroed or blanked out. In contrast, portions of the continuous video signal received by gate 18 while a circuit 22 pulse is present are not affected. The "1" factored, unaffected portions are as small as one or two pixels in size when the pulse from circuit 22 is at a minimum width, which lasts for a microsecond or less. The output signal value from gate 18 corresponding to a "zero" grey scale value on a black-and-white monitor is controlled via zero adjust circuit 24. Circuit 24 includes conventional means for a human operator to adjust the zero value as desired.

The output from video gate 18 may be viewed as a relatively continuous, constant "zero" value signal interrupted only by relatively short nonzero signal elements having equal, selected lengths. The nonzero signal elements will vary in strength so as to correspond to appropriate grey scale values for the portions of an image that these elements represent. Output from gate 18 is received by buffer 26, which, like buffer 16 is not a memory, but rather is a means to adjust signal strength. Buffer 26 insures that the range of signal values from gate 18 is compatible the operating ranges of components electrically downstream of video gate 18.

The now preprocessed signal from buffer 26 is sent to video select mechanism 28, which also receives the raw video signal from camera sensors 10. The function of mechanism 28 is to select which video signal, either the raw signal directly from sensors 10 or the preprocessed video signal from buffer 26, will be passed to camera control box 14. Depending on the amount of target motion, the speed of transient events and other considerations, it may be desired to use the raw video signal if the frequency of the targeted event is below 15 Hz, so that the targeted event can be imaged from a single camera frame without aliasing. The raw video signal may also be used during setup and alignment procedures for the camera and associated equipment. For events occurring at a frequency higher than 15 Hz, it will be desired to use the preprocessed video signal from buffer 26.

It will be noted that camera control box 14 is a standard feature of a commercially available camera. The preprocessed video signal from gate 18 will be further processed by the camera's control box 14 in the same way that box 14 conventionally processes raw video signals. That is, signal components are added to the preprocessed signal, the added components demarking divisions between frames and divisions between lines within frames. Also, forward scan lines are digitized, reverse scan lines are both digitized and re-reversed, and duplicates of both forward and reverse scanned lines are added to the preprocessed signal.

The signal output from control box may be regarded as lines grouped into a series of video frames, and these frames are captured by frame grabber 30 located within computer 32, which can be a '386 IBM brand microcomputer or one compatible therewith. Each video frame is scanned as it is captured by the frame grabber, and pixels within the video frames having non-zero grey scale values are added to a cumulative buffer memory 34. That is, grey scale values for these pixels are cumulatively added at locations within memory 34 corresponding to the position of these pixels within their respective captured frames. A record is maintained by register 36 for each of these locations to track how many times a pixel grey scale value has been added to the location. The accumulation of pixel data within buffer memory 34 continues until a human operator stops the accumulation via commands from the keyboard (not shown) of computer 32.

At this point, processor 38 divides the sum of the accumulated nonzero values at each memory location by the number of additions made at each location. The result is that each of the memory locations represents a linearly averaged pixel value at a corresponding point of a final, composite image, which is presented as a pixel array on monitor 40. Consequently, each pixel of this monitor array represents a linear average of the emittance (or intensity, if a standard video camera is used) of a respective spatial location on the targeted event. For locations in memory 34 where no nonzero pixel values have occurred, there will be a corresponding zero value pixel on monitor 40, the color for such pixels typically being the most complete black available for the grey scale of the monitor.

It will be recalled that the signals received by frame grabber 30 from camera control box 14 will represent lines in a repeating, four-part sequence of forward scan line, a duplicate of the forward scan line, a reverse scan and a duplicate of the reverse scan line. For some applications, it may be desired to use less than all the scan lines to create a composite image. In such an event, synchronization hardware such as that referenced in U.S. Pat. Nos. 4,970,597 and 5,136,383 can be used to monitor those signals from the camera which indicate the position of the camera's horizontal scanning mirror. The synchronization hardware can be programmed to detect forward scan line signals that begin at the onset of a forward scan of the camera's horizontal mirror, or to detect reverse line signals that begin at the onset of a reverse scan of the horizontal mirror, or duplicates of these line signals occurring between the aforementioned onsets, or to detect any combination of these line signals. Synchronization hardware 42 can be further programmed to send signals to frame grabber when a selected type of line signal is detected. Frame grabber will respond by ignoring all line signals except line signals of one or more selected types. Consequently, the composite image, which appears on an output device such as monitor 40 or is saved in a data storage device, will be comprised only of pixels from selected line types.

Figure 2:
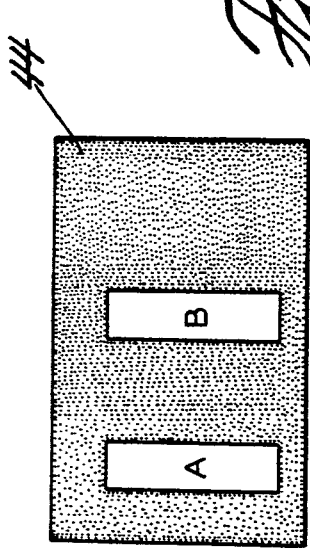
FIG. 2 is a test target for the camera.
Figure 3:
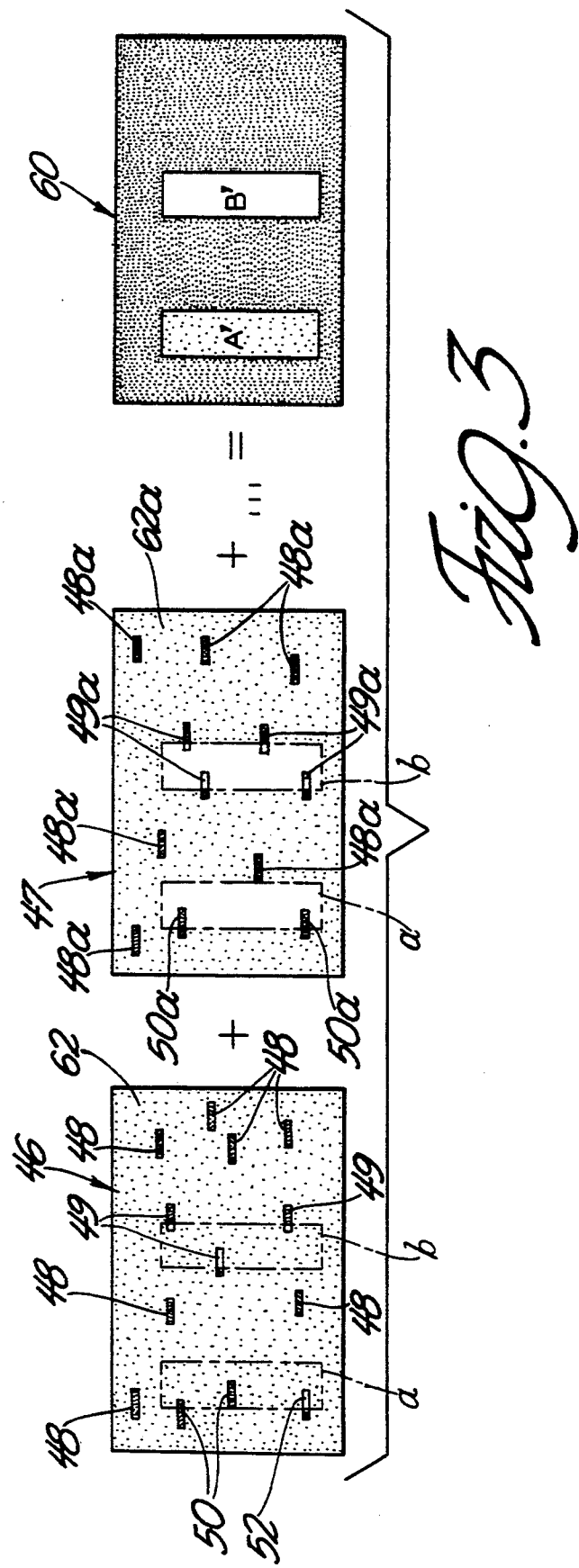
FIG. 3 is a diagrammatic representation of the summation of a plurality of frames to form a composite image.

FIGS. 2 and 3 diagrammatically illustrate the manner in which a series of frames are combined in order to create a composite image using the method described above. In FIG. 2, "B" is a rapidly repeating event of interest and timing signal 12 is delayed by circuit 20 so that video gate 18 will not zero out pixels associated with event "B". In other words, pulses from circuit 22 are timed to turn gate 18 "ON" during event "B", and consequently "B" can be regarded as synchronous with gate 18. "A" is another event and, for purposes of explanation, it is chosen to be the same shape as event "B", both events being represented as white rectangles contrasting with a black background 44. Both events may be regarded as existing or occurring only when a pulse of energy reflects off or emanates from the respective white rectangles. However, event "A" occurs at a different frequency than event "B", and is not synchronous with event "B" or with gate 18.

In FIG. 3 are shown a first video frame 46 taken by our method, a second video frame taken by our method, and a final image 60 compiled from a multiplicity of frames such as frames 46 and 47. In frames 46 and 47, the physical location of events "A" and "B" are represented respectively by dashed rectangular outlines "a" and "b". In frame 46 are signal segments 48, 49, 50 and 52, which occurred while gate 18 was "ON". All of signal segments 48 occurred while the camera was viewing background 44 and all of signal segments 49 occurred partly during event "B". Signal segments 50 occurred at least in part at the event "A" location but not <u>during</u> event "A," and signal segment 52 occurs during event "A." The remainder 62 of frame, which is not occupied by "ON" segments 48, 49, 50 or 52, occurred while gate 18 was "OFF". It will be understood that remainder 62 is in reality completely black and visually indistinguishable from the black portions of segments 48, 49, 50 and 52. For purposes of illustration, however, remainder 62 is represented as a dotted or grey area so that all of the "ON" signal segments can be clearly shown.

In frame 47 are signal segments 48a, 49a, and 50a, which occurred while gate 18 was "ON". All of signal segments 48a occurred while the camera was viewing background 44 and all of signal segments 49a occurred partly during event "B". Signal segments 50a occurred at least in part while at the location of event "A" but not during event "A". In frame 47, no signal segment occurred while event "A" was occurring. The remainder 62a of frame, which is not occupied by "ON" segments 48a, 49a or 50a, occurred while gate 18 was "OFF". It will be understood that remainder 62a is in reality completely black and visually indistinguishable from the black portions of segments 48a, 49a and 50a. For purposes of illustration, however, remainder 62a is represented as a dotted or grey area so that all of the "ON" signal segments can be clearly shown.

In frames 46 and 47, the signal "ON" segments or parts thereof occurring at the physical location of nonsynchronous event "A" will sometimes have a white value on the grey scale and sometimes have a black value on this scale. These segment parts will be white if a particular repetition of event "A" is by chance simultaneous with an "ON" segment. Contrastingly, the "ON" signal segments or parts thereof occurring at the physical location of synchronous event "B" will always have a white value on the grey scale because the "ON" condition of gate 18 is synchronized with event "B". Consequently, in final image 60, image portion A' (representing event "A") will be shown at an averaged, grey, intensity whereas image portion B' (representing event "B") will be shown at a white intensity. From FIGS. 2 and 3, it will be understood that two similar events, such as "A" and "B" which are not simultaneous, can be distinguished from on another by our imaging method.

We wish it to be understood that we do not desire to be limited to the exact details of construction shown herein since obvious modifications will occur to those skilled in the relevant arts without departing from the spirit and scope of the following claims.

We claim:

1. A technique to image a recurring high speed event using a standard camera, comprising:

acquiring raw video signals from sensors of the camera before the raw video signals are affected by a processing means in the camera;

sending the raw video signals to a preprocessing means for selectively zeroing chosen portions of the raw video signal;

generating a timing signal at a selected constant time interval before the occurrence of the high speed event;

predetermining a constant, zero value for the chosen portions of the raw video signals zeroed by the preprocessing means;

in response to the timing signal, sending intermittent pulses to the preprocessing means, the preprocessing means zeroing the raw video signals except during the pulses, whereby selected discrete portions of the raw video signals are not zeroed;

delaying the timing signal to synchronize pulses with occurrences of the high speed event;

using a pulse width circuit means to control the duration of the intermittent pulses;

directing preprocessed video signals from the preprocessing means to the signal processing means in the camera;

using the processing means to group the preprocessed video signals into frame signals comprised of sets of line signals containing signal representations of the selected discrete portions;

sending the frame signals to a frame grabber;

scanning the frame signals at the frame grabber to find the signal representations;

for respective signal locations within the frame signals, adding together values of the signal representations associated with the respective signal locations;

determining an average value for signal representations at the respective signal locations;

outputting a final signal comprised of averaged values at the respective locations.

2. The method of claim 1 wherein the camera executes a raster pattern by scanning along parallel lines of an image field, and the line signals within the frame signals include a first set of line signals corresponding to a scan in one direction along one line in the image field, a second set of line signals corresponding to a scan in another direction along another line in the image field, a third set of line signals which is a copy of the first set and a fourth set of line signals which is a copy of the second set, the method further including the step of excluding the signal representations in one or more sets from the final signal.

3. The method of claim 2 wherein the discrete portions represent fewer pixels than do line signals.

4. A technique to image a recurring event, comprising:

acquiring video signals from a camera;

sending the video signals to a preprocessing means for selecting discrete portions of the video signal;

sending pulses to the preprocessing means, the preprocessing means controlling lengths of the discrete portions in response to the pulses;

timing the pulses to synchronize the selection of the discrete portions with occurrences of the event;

nullifying signal value of nonselected portions of the video signals;

grouping video signals from the preprocessing means into units containing the selected discrete portions;

for respective locations in the units, accumulating values of the discrete portions associated with the respective locations;

using the accumulated values to determine a typified value for discrete portions at the respective locations;

outputting a final signal comprised of typified values at the respective locations.

5. The method of claim 4 wherein the units include first line signals corresponding to line scans of a raster pattern of the camera and second line signals that are copies of the first line signals, and wherein the line signals contain the values of the discrete portions, the method including the steps of:

discriminating between first and second line signals;

using only values of discrete portions within first line signals to determine the typified values for the discrete portion.

6. The method of claim 4 wherein the units include one set of line signals corresponding to line scans in one direction of a raster pattern of the camera and another set of line signals corresponding to line scans in another direction of the raster pattern of the camera, and wherein the line signals contain the values of the discrete portions, the method including the steps of:

discriminating between line signals of the one and the other sets;

using only values of discrete portions within line signals of the one set to determine the typified values for the discrete portion.

* * * * *